United States Patent
Takahashi et al.

(10) Patent No.: US 11,166,133 B2
(45) Date of Patent: Nov. 2, 2021

(54) INFORMATION PROCESSING APPARATUS

(71) Applicant: Panasonic Intellectual Property Management Co., Ltd., Osaka (JP)

(72) Inventors: Masaki Takahashi, Osaka (JP); Kazunobu Ishikawa, Osaka (JP); Takuya Yamaguchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 242 days.

(21) Appl. No.: 16/295,469

(22) Filed: Mar. 7, 2019

(65) Prior Publication Data
US 2019/0281430 A1   Sep. 12, 2019

(30) Foreign Application Priority Data

Mar. 12, 2018   (JP) .............................. JP2018-044229

(51) Int. Cl.
*H04W 4/44* (2018.01)
*H04W 4/38* (2018.01)
(Continued)

(52) U.S. Cl.
CPC .......... *H04W 4/44* (2018.02); *G06K 9/00791* (2013.01); *G06K 9/00805* (2013.01);
(Continued)

(58) Field of Classification Search
CPC ...... H04W 4/44; H04W 4/38; G06K 9/00791; G06K 9/00805; G06K 9/00979; G06K 9/6256; G06K 9/6293; G06K 9/6857
See application file for complete search history.

(56) References Cited

U.S. PATENT DOCUMENTS 9,494,439 B1 *  11/2016  Ross ..................... G05D 1/0027
2017/0090480 A1 *  3/2017  Ho ......................... G05D 1/0214
(Continued)

FOREIGN PATENT DOCUMENTS

| EP | 3 006 277 | 4/2016 |
|----|-----------|--------|
| JP | 2016-91267 | 5/2016 |

OTHER PUBLICATIONS

Extended European Search Report dated Dec. 10, 2019 in corresponding European Patent Application No. 19159865.5.
(Continued)

*Primary Examiner* — Yazan A Soofi
*Assistant Examiner* — Naeem Taslim Alam
(74) *Attorney, Agent, or Firm* — Wenderoth, Lind & Ponack, L.L.P.

(57) ABSTRACT

An information processing apparatus is configured to cause a first recognizer to execute a first recognition process that takes sensor information as input, and a second recognizer to execute a second recognition process that takes the sensor information as input, the second recognizer being configured to operate under different capability conditions from the first recognizer; determine one of a transmission necessity and a transmission priority of the sensor information depending on a difference between a first recognition result of the first recognition process and a second recognition result of the second recognition process; and transmit the sensor information to a server apparatus according to the determined one of the transmission necessity and the transmission priority.

11 Claims, 8 Drawing Sheets

(51) Int. Cl.
    *G06K 9/00*         (2006.01)
    *G06K 9/62*         (2006.01)
    *G06K 9/68*         (2006.01)

(52) U.S. Cl.
    CPC ....... *G06K 9/00979* (2013.01); *G06K 9/6256* (2013.01); *G06K 9/6293* (2013.01); *G06K 9/6857* (2013.01); *H04W 4/38* (2018.02)

(56) References Cited

U.S. PATENT DOCUMENTS

| | | |
|---|---|---|
| 2017/0272450 A1* | 9/2017 | Krishnamurthi ...... H04W 4/023 |
| 2018/0329418 A1* | 11/2018 | Baalke ................. G05D 1/0246 |
| 2019/0019409 A1* | 1/2019 | Farr ..................... G08G 1/0965 |
| 2019/0129421 A1* | 5/2019 | Ewert .................. G06K 9/6262 |
| 2019/0205744 A1* | 7/2019 | Mondello ............ G05D 1/0287 |
| 2019/0205765 A1* | 7/2019 | Mondello ............ G05D 1/0287 |
| 2019/0220675 A1* | 7/2019 | Guo .................... G06K 9/00791 |
| 2019/0279000 A1* | 9/2019 | Pfeifle ................ G06K 9/00791 |

OTHER PUBLICATIONS

Matzka et al., "Efficient Resource Allocation for Attentive Automotive Vision Systems," IEEE Transactions On Intelligent Transportation Systems, vol. 13, No. 2, pp. 859-872, Jun. 2012.
Partial European Search Report dated Aug. 20, 2019 in corresponding European Patent Application No. 19159865.5.

* cited by examiner

FIG. 3A

| DETECTION RESULT DATA | | | |
|---|---|---|---|
| SCENE ID | 00000001 | | |
| IMAGE DATA | 00000001.raw | | |
| DETECTION RESULT | TYPE | DETECTION RANGE | RELIABILITY |
| | PEDESTRIAN | (a1, b1) - (c1, d1) | 98.5% |
| | CAR | (a2, b2) - (c2, d2) | 97.2% |
| | ⋮ | ⋮ | ⋮ |
| TIME (GMT) | 20:00 | | |
| BRAKING CONDITIONS | AABBCC... | | |
| ⋮ | ⋮ | | |

FIG. 3B

| DETECTION RESULT WITH PRIORITY RANK DATA | | | |
|---|---|---|---|
| PRIORITY RANK | 10 | | |
| SCENE ID | 00000001 | | |
| IMAGE DATA | 00000001.raw | | |
| DETECTION RESULT | TYPE | DETECTION RANGE | RELIABILITY |
| | PEDESTRIAN | (a1, b1) - (c1, d1) | 98.5% |
| | CAR | (a2, b2) - (c2, d2) | 97.2% |
| | ⋮ | ⋮ | ⋮ |
| TIME (GMT) | 20:00 | | |
| BRAKING CONDITIONS | AABBCC... | | |
| ⋮ | ⋮ | | |

FIG. 11

| DETECTION RESULT DATA | | | | 1301 |
|---|---|---|---|---|
| SCENE ID | 00000001 | | | |
| IMAGE DATA | 00000001.raw | | | |
| DETECTION RESULT | TYPE | DETECTION RANGE | RELIABILITY | |
| | PEDESTRIAN | (a1, b1) - (c1, d1) | 98.5% | |
| | CAR | (a2, b2) - (c2, d2) | 97.2% | |
| | ⋮ | ⋮ | ⋮ | |
| TIME (GMT) | 20:00 | | | |
| BRAKING CONDITIONS | DRIVING CONTROL | SPEED: 40.23 km/h<br>ACCELERATION: -0.123 m/s²<br>ORIENTATION: 91° ... | | |
| | EXTERNAL CONDITIONS | WEATHER: CLEAR<br>ROAD: REGULAR PAVED ROAD<br>LOCATION: ... | | |
| | ⋮ | ⋮ | | |
| ⋮ | ⋮ | | | |

INFORMATION PROCESSING APPARATUS

CROSS REFERENCE TO RELATED APPLICATION

This application claims the benefit of priority of Japanese Patent Application Number 2018-044229 filed on Mar. 12, 2018, the entire content of which is hereby incorporated by reference.

BACKGROUND

1. Technical Field

The present disclosure relates to data transmission for updating control functionality in a self-driving car. More specifically, the present disclosure relates to data transmission in which information data obtained from a sensor included in the self-driving car is uploaded to a server apparatus via a network.

2. Description of the Related Art

In recent years, a large number of studies have been conducted on self-driving cars (also referred to as robot cars, etc.) that are driven by a machine instead of a human driver and a large number of the self-driving cars have been commercialized. There are self-driving cars including a real-time object detector that uses artificial intelligence (AI), e.g. a neural network, as a component. There is, however, a risk of flaws, e.g. misdetection and detection failure, occurring during the real-time object detection when the self-driving cars are first shipped. Additional training is, therefore, considered to reduce such flaws. Training data for this additional training is obtained by a sensor, e.g. a camera, included in the car, and collected by an apparatus (e.g. a server apparatus) that performs a training process.

In regard to this, a technique exists for transmitting only a portion of the obtained data to the server apparatus. For example, in Patent Literature (PTL) 1 (Japanese Unexamined Patent Application Publication No. 2016-91267), a technique is proposed for transmitting not all driving video data recorded by a car driving recorder, but only obtained driving video data that has been determined to be transmitted to the server apparatus based on an assigned rank.

SUMMARY

However, collecting the training data efficiently with the technique proposed in PTL 1 poses difficulties.

The present disclosure, accordingly, provides an information processing apparatus that makes it possible to efficiently collect the training data to obtaining a recognition model for self-driving.

An information processing apparatus according to an aspect of the present disclosure causes a first recognizer to execute a first recognition process that takes sensor information as input, and a second recognizer to execute a second recognition process that takes the sensor information as input, the second recognizer having different capability conditions from the first recognizer; determines one of a transmission necessity and a transmission priority of the sensor information depending on a difference between a first recognition result of the first recognition process and a second recognition result of the second recognition process; and transmits the sensor information to a server apparatus based on the determined one of the transmission necessity and the transmission priority.

Note that these comprehensive or concrete aspects of the present disclosure may be realized on an apparatus, integrated circuit, computer program, or a recording medium such as a computer-readable CD-ROM, and may also be realized by optionally combining apparatuses, integrated circuits, computer programs, and recording media.

The above-mentioned aspects make it possible to efficiently collect training data to obtain a recognition model for self-driving.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 3A is a diagram showing an example of a configuration of detection result data in the embodiment;

FIG. 3B is a diagram showing an example of a configuration of detection result with priority rank data in the embodiment;

FIG. 11 is a diagram showing another example of a configuration of detection result data in the embodiment or in the variation thereof.

DETAILED DESCRIPTION OF THE EMBODIMENT

Figure 1:
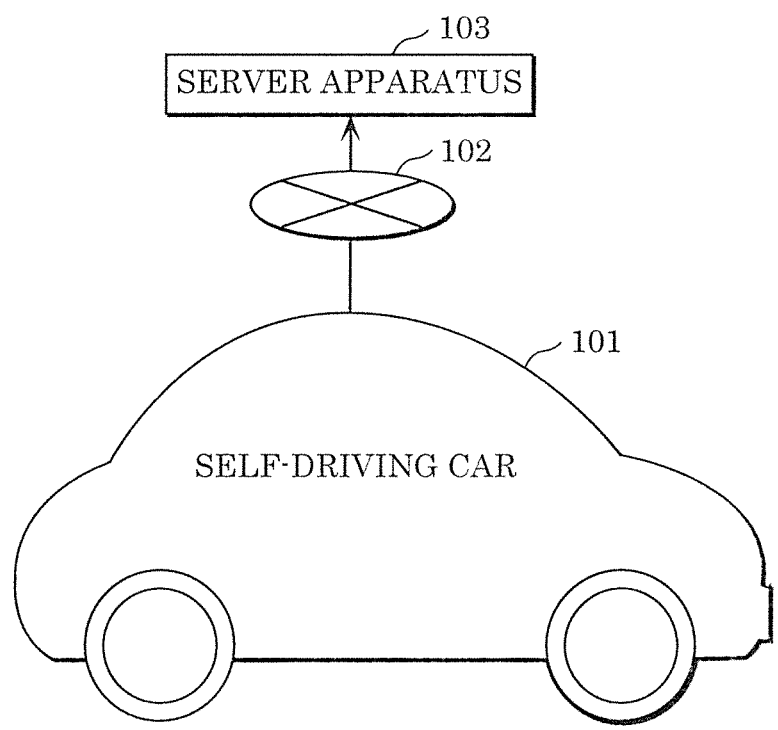
FIG. 1 is a block diagram showing an example of a configuration of a system including a self-driving car and server apparatus in an embodiment.

Underlying Knowledge Forming Basis of Present Disclosure

In a self-driving car, the following configuration for updating AI functionality used in real-time object detection can be conceived.

Image data and the like obtained by an optical sensor, e.g. a camera, is uploaded from the self-driving car to a server apparatus via a communication network. In a training system included in the server apparatus, retrained AI data (recognition model) is generated through retraining using this image data as training data. The self-driving car updates the AI functionality by replacing the AI data for the real-time object detection with the retrained AI data downloaded from the server apparatus. With this, a detector for the real-time object detection is updated.

However, since an amount of the image data subject to be uploaded from the self-driving car to the server apparatus is extensive, transmitting all of this data puts a strain on the bandwidth of the network and requires a long time to finish. A situation may, therefore, occur in which not all of the accumulated data can be transmitted in time when new data is not accumulated, e.g. when the self-driving car is not used. Moreover, when the data transmission takes too much time due to the large amount of the data to be transmitted or traffic congestion, a car battery depletes too quickly in conditions in which the car cannot be recharged since more electric power is consumed. Depending on circumstances, a situation may occur wherein the battery of the self-driving car is depleted and cannot be driven when the user wants to use the self-driving car.

In such a case, the image data obtained by the self-driving car cannot be used in the server apparatus for retraining straight away or cannot be used altogether, i.e., the server apparatus cannot collect training data efficiently.

In order to solve this problem an information processing apparatus according to an aspect of the present disclosure causes a first recognizer to execute a first recognition process that takes sensor information as input, and a second recognizer to execute a second recognition process that takes the sensor information as input, the second recognizer having different capability conditions from the first recognizer; determines one of a transmission necessity and a transmission priority of the sensor information depending on a difference between a first recognition result of the first recognition process and a second recognition result of the second recognition process; and transmits the sensor information to a server apparatus based on the determined one of the transmission necessity and the transmission priority.

This configuration makes it possible to limit situations in which the image data beneficial for the retraining cannot be transmitted to the server apparatus, which performs the retraining, due to issues with the network bandwidth or the electric power consumption, even when the amount of the data accumulated while driving is extensive. In other words, by transmitting the image data beneficial for advancing the AI on priority basis to the server apparatus when the network bandwidth and transmission time are limited, the training data is efficiently collected by the training system. This makes it possible to advance the AI with more certainty, speed up the AI update cycle in the self-driving car, and provide a safer and more pleasant self-driving car to the user early on.

The second recognizer may have more computational resources than the first recognizer.

For example, when the self-driving car is parked, there are times when the computational resources used for other processes necessary for self-driving can be reallocated to the object detection. At such a time, by causing the second recognizer, which has higher recognition accuracy but uses more computational resources than first recognizer, to execute a process, the second recognition result can be obtained that is likely to be different from the first recognition result.

The information processing apparatus may determine one of the transmission necessity and the transmission priority depending on a numerical difference between the first recognition result and the second recognition result. The information processing apparatus may determine one of the transmission necessity and the transmission priority depending on a type difference between the first recognition result and the second recognition result.

By determining the transmission necessity or transmission priority based on such a difference, the training data, which is likely to be beneficial to the retraining, is transmitted to the server apparatus on priority basis. In other words, the training data is collected efficiently.

The information processing apparatus further determines whether a vehicle including the information processing apparatus has a surplus of computational resources greater than or equal to a predetermined amount, and may cause the second recognizer to execute a recognition process when it is determined that the vehicle has a surplus of the computational resources greater than or equal to the predetermined amount.

With this, the second recognizer, which is more accurate, performs the process during a time the process can be executed while limiting conditions in which the user is prevented from using the self-driving car due to this process.

The second recognizer that performs the second recognition process may be configured according to one of (i) available computational resources in the vehicle including the information processing apparatus and (ii) a training purpose for the first recognizer.

In other words, one of a variety of available second recognizers is selected and used for the second recognition process depending on the amount of available computational resources. This makes it possible to effectively utilize the resources in the self-driving car. For example, the second recognition process can be executed for collecting training data suitable for implementing recognition of new objects in order to provide new functionality in the future. This encourages providing a safer and more pleasant self-driving car to the user.

The second recognizer may be obtained from the server apparatus via communication.

This enables the second recognizer mounted in the self-driving car to be updated with great flexibility regarding place or time, making it more versatile.

The information processing apparatus may prioritize sensor information that fulfills a predetermined condition over other sensor information, and cause the second recognizer to execute the second recognition process.

By filtering the data using the condition, the training data can, for example, be collected efficiently under driving conditions in which there is relatively little training data. By performing the training using training data collected in such a way, object recognition accuracy can be boosted above a fixed level without exception regardless the possibility of certain driving conditions occurring. A safer and more pleasant self-driving car can, therefore, be provided to the user early on.

A program according to an aspect of the present disclosure that is executed by a processor included in the information processing apparatus installed in the vehicle that is communicably connected to the server apparatus, the program causing the processor to (i) execute a first recognition process that takes the sensor information as input by a first recognizer, (ii) execute a second recognition process that takes the sensor information as input by a second recognizer that has different capability conditions from the first recognizer, determine one of a transmission necessity and a transmission priority of the sensor information depending on a difference between a first recognition result of the first recognition process and a second recognition result of the second recognition process, and (iv) transmit the sensor information to the server apparatus based on the determined one of the transmission necessity and the transmission priority.

This makes it possible to limit situations in which the image data beneficial for the retraining cannot be transmitted to the server apparatus, which performs the retraining, clue to limitations in the available network bandwidth or the electric power consumption even when the amount of the data accumulated while driving is extensive. In other words, by transmitting the image data beneficial for advancing the AI on a priority basis to the server apparatus when the network bandwidth and transmission time are limited, the training data is efficiently collected by the training system. This makes it possible to advance the AI with more certainty, speed up the AI upgrade cycle in the self-driving car, and provide a safer and more pleasant self-driving car to the user early on.

Note that each of the embodiments described below shows a specific example in the present disclosure. Numerical values, shapes, components, steps and their order, and the like are mere examples and are not intended to limit the present disclosure. Components in the following embodiments not mentioned in any of the independent claims that define the broadest concepts are described as optional elements. The contents of each of the embodiments and variations thereof can be combined provided no inconsistencies are introduced.

Embodiment 1

An information processing apparatus in a self-driving car according to the present embodiment will be described with reference to FIGS. 1 to 4.

Configuration

FIG. 1 is a block diagram showing an example of a configuration of a system including the self-driving car and a server apparatus in the embodiment. As illustrated in FIG. 1, self-driving car 101 is communicably connected to server apparatus 103 via network 102 that is a communication network.

Server apparatus 103 in the present embodiment may have AI retraining functionality using information data including image data for object detection, but may also only have functionality to accumulate such information data temporarily. In case of the latter, the information data is further input into another information processing system having retraining functionality. An example is described below, however, in which server apparatus 103 has the above retraining functionality.

The information data used in this retraining is provided by self-driving car 101 to server apparatus 103 via network 102.

Figure 2:
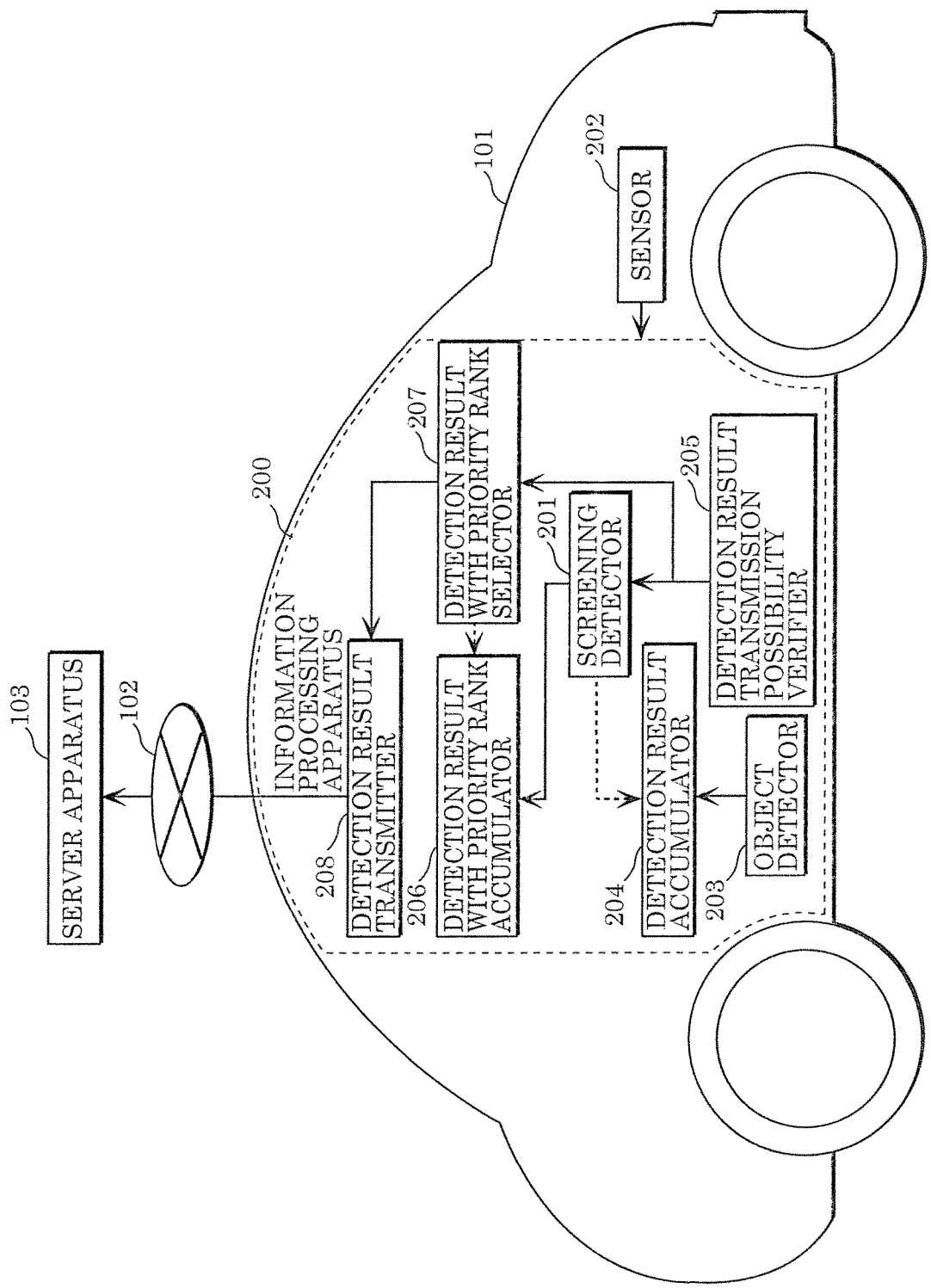
FIG. 2 is a block diagram showing an example of a functional configuration of an information processing apparatus included in the self-driving car in the embodiment.

FIG. 2 is a block diagram showing an example of a functional configuration of information processing apparatus 200 included in self-driving car 101 in the present embodiment.

In self-driving car 101, when self-driving, real-time object detection necessary for the self-driving is executed in information processing apparatus 200 using the information data including the image data output from sensor 202 usable for object detection, such as an optical sensor, e.g. a camera or light detection and ranging (LIDAR), ultrasonic sensor, or radio frequency sensor, e.g. millimeter wave. Information processing apparatus 200 is, for example, a microcontroller included in an on-board electronic control unit (ECU).

Information processing apparatus 200 includes object detector 203, detection result accumulator 204, detection result transmission possibility verifier 205, detection result with priority rank accumulator 206, detection result with priority rank selector 207, and detection result transmitter 208 as functional components. Each of the functional components is provided by the microcontroller included in information processing apparatus 200 and executes a predetermined program using a processor, or stores the execution result of this program in a memory or output externally via an output port. This processor is an example of a controller in the present embodiment.

Object detector 203 is a recognition model for detecting objects in real-time based on information presented in the information data output by sensor 202 (hereinafter, referred to as sensor information). The data of this detection result is accumulated by detection result accumulator 204. FIG. 3A shows an example of a configuration of detection result data 301 that includes the object detection result from object detector 203 accumulated by detection result accumulator 204.

Detection result data 301 in this example includes scene ID 302 uniquely identifying the detection result data, file path (or file name) 303 of the image data, detection result 304, time information 305 indicating the time the image is taken, and the like. The detection result data may further include braking conditions 306 that is an example of driving control information indicating control details for the driving when the image is taken, e.g. as a speed and acceleration of the car, and whether the car is braking. Detection result 304 includes a type of the detected object, position range of object in the image taken, reliability, and the like.

Note that object recognition during the self-driving for which the result is used is dependent on the object detection executed by object detector 203.

Object detector 203 is an example of the first recognizer in the present embodiment. The above object detection process executed by object detector 203 that takes the sensor information as input is an example of a first recognition process in the present embodiment. Detection result 304 accumulated by detection result accumulator 204 and included in detection result data 301 is an example of a first recognition result in the present embodiment.

Screening detector 201 includes a detector that is the recognition model for detecting objects based on the sensor information. Compared to the object detection by object detector 203, however, the object detection by screening detector 201 is executed under different functionality conditions or capability conditions (hereinafter, referred to as capability conditions), such as using a larger image size, i.e., higher resolution input images, or parallel computing with a higher bit depth. The input images processed by object detector 203 and screening detector 201 with different resolutions are, for example, the image data, which is temporarily stored on a storage apparatus (not illustrated) in self-driving car 101, downscaled to different resolutions.

The object detection by screening detector 201 is not performed real-time; the object detection process is, for example, executed for 30 minutes based on one hour's worth of the image data, and provides more accurate results than object detector 203. In other words, even when screening detector 201 and object detector 203 each perform the object detection based on images of the same scene, the results may still vary. Screening detector 201 (i) compares the object detection result with the detection result indicated by detection result data 301 accumulated by detection result accumulator 204, (ii) determines the priority rank depending on the difference between both, (iii) generates the detection result with priority rank data, which is data including the object detection result to which the determined priority information is added, and (iv) accumulates the detection result with priority rank data in detection result in priority rank accumulator 206. FIG. 3B shows detection result with priority rank data 321 that is an example of a configuration of the detection result with priority rank data and is accumulated by detection result with priority rank accumulator 206. In the example in FIG. 3B, priority rank 322 in detection result with priority rank data 321 is the above priority rank determined by screening detector 201.

The differences in the above object detection results are, for example, numerical differences, and to give concrete examples, differences in the number of objects detected in an image of the same scene or the number of boxes indicating these objects, and differences of the objects or the position inside the boxes of the entirety of the image or a proportion of the entirety of the image. Screening detector 201 determines the priority rank so the corresponding sensor information is transmitted to server apparatus 103 with a higher priority the larger the differences are. Another example of the object detection result differences is a variety (type) of the detected objects, e.g. whether the detected object is a pedestrian, bicycle, motorcycle, car, obstacle, or a sign. Screening detector 201 determines the priority rank so that the corresponding sensor information is transmitted to server apparatus 103 with a higher priority when there is such a difference in the object detection results.

Note that the priority rank may be determined based on preset parameters corresponding on how large the differences are, and may also be determined, for example, using an index value such as mean Average Precision (mAP) that is a calculation of the object detection results.

Screening detector 201 is an example of the second recognizer and the determiner in the present embodiment. The second recognizer is a neural network corresponding to a recognition model such as artificial intelligence (AI), and is a software program. The above object detection process executed by screening detector 201 that takes the sensor information as input is an example of the second recognition process in the present embodiment. Detection result 324 included in detection result with priority rank data 321 is an example of the second recognition result in the present embodiment.

The second recognizer may have more computational resources than the first recognizer.

For example, similar to when the self-driving car is parked, there are times when the computational resources used for other processes necessary for self-driving can be reallocated to the object detection. At such a time, by causing the second recognizer, which has higher recognition precision but uses more computational resources than first recognizer, to execute a process, the second recognition result can be obtained that is likely to be different from the first recognition result.

The information processing apparatus may determine one of the transmission necessity and the transmission priority depending on a numerical difference between the first recognition result and the second recognition result. The information processing apparatus may determine one of the transmission necessity and the transmission priority depending on a type difference between the first recognition result and the second recognition result.

By determining the transmission necessity or transmission priority based on such a difference, the training data, which is likely to be beneficial to the retraining, is transmitted to the server apparatus on priority basis. In other words, the training data is collected efficiently.

The information processing apparatus further determines whether a vehicle including the information processing apparatus has a surplus of computational resources greater than or equal to a predetermined amount, and may cause the second recognizer to execute a recognition process when the assessor assesses that the vehicle has a surplus of the computational resources greater than or equal to the predetermined amount.

With this, the second recognizer, which is more precise, performs the process during a time the process can be executed while limiting conditions in which the user is prevented from using the self-driving car due to this process.

The second recognizer that performs the second recognition process is configured according to one of (i) available computational resources in the vehicle including the information processing apparatus and (ii) a training purpose for the first recognizer.

In other words, by being able to use the versatile second recognizer, the second recognizer can, for example, execute the second recognition process depending on the amount of available computational resources. This makes it possible to effectively utilize the resources in the self-driving car. For example, the second recognition process can be executed for collecting training data for implementing recognition of new objects in order to provide new functionality in the future. This encourages providing a safer and more pleasant self-driving car to the user.

The second recognizer may be obtained from the server apparatus via communication.

This enables the second recognizer mounted in the self-driving car to be updated with great freedom regarding place or time, making it more versatile.

The information processing apparatus may prioritize sensor information that fulfills a predetermined condition over other sensor information, and cause the second recognizer to execute the second recognition process.

By filtering the data using the condition, the training data can, for example, be collected efficiently under driving conditions in which there is relatively little training data. By performing training using training data collected in such a way, object recognition precision can be boosted above a fixed level without exception regardless of the possibility of certain driving conditions occurring. A safer and more pleasant self-driving car can, therefore, be provided to the user early on.

A program according to an aspect of the present disclosure that is executed by a processor included in the information processing apparatus installed in the vehicle that is communicably connected to the server apparatus, the program causing the processor to (i) execute a first recognition process that takes the sensor information as input by a first recognizer, (ii) execute a second recognition process that takes the sensor information as input by a second recognizer that has different capability conditions from the first recognizer, (iii) determine one of a transmission necessity and a transmission priority of the sensor information depending on a difference between a first recognition result of the first recognition process and a second recognition result of the second recognition process, and (iv) transmit the sensor information to the server apparatus based on the determined one of the transmission necessity and the transmission priority.

This makes it possible to limit situations in which the image data beneficial for the retraining cannot be transmitted to the server apparatus, which performs the retraining, due to limitations in the available network bandwidth or the electric power consumption even when the amount of the data accumulated while driving is extensive. In other words, by transmitting the image data beneficial for advancing the AI on a priority basis to the server apparatus when the network bandwidth and transmission time are limited, the training data is efficiently collected by the training system. This makes it possible to advance the AI with more certainty, speed up the AI upgrade cycle in the self-driving car, and provide a safer and more pleasant self-driving car to the user early on.

Detection result transmission possibility verifier 205 determines whether the sensor information can be transmitted to server apparatus 103 based on predetermined information. This predetermined information relates to, for example, whether self-driving car 101 is in a parked state, whether self-driving car 101 is charged to or over a predetermined amount, or whether self-driving car 101 is being charged. This information serves as determination factors relating to whether screening detector 201 can execute the processes up to the determining of the priority rank of the sensor information to be transmitted to server apparatus 103. In other words, detection result transmission possibility verifier 205 determines whether the sensor information can be transmitted to server apparatus 103 based on whether the necessary resources (hereinafter, computational resources) are available, e.g. the processor, memory, and electric power consumed thereby necessary for the processes executed by screening detector 201. Detection result transmission possibility verifier 205 is an example of the assessor in the present embodiment.

Note that since screening detector 201, as mentioned above, produces more accurate results than object detector 203, more computational resources may be required for these processes. In order to finish these processes in the shortest time frame possible, the processor may require more computational resources since the processor may operate at a higher driving frequency when actuating screening detector 201 than when actuating object detector 203.

For example, in the above predetermined information, available information relating to whether a network with enough available bandwidth to transmit data at or above a predetermined speed is available is included. This information serves as a determination factor relating to whether the sensor information can be transmitted to server apparatus 103 based on the determined priority rank.

Detection result transmission possibility verifier 205, for example, obtains this information based on data output as process results by a type of program executed in information processing apparatus 200, or data obtained from another ECU via an on-board network (not illustrated) to which information processing apparatus 200 is connected. When it is determined that transmission is possible, detection result transmission possibility verifier 205 boots up screening detector 201 and detection result with priority rank selector 207.

Detection result with priority rank selector 207 selects detection result data with the highest priority based on priority rank 322 included in detection result with priority rank data 321 accumulated by detection result with priority rank accumulator 206.

Detection result transmitter 208 transmits the image data indicated by the information of image data included in the sensor information, more specifically detection result with priority rank data 321, corresponding to the detection result data selected by detection result with priority rank selector 207 to server apparatus 103 via network 102. Detection result with priority rank selector 207 and detection result transmitter 208 are each an example of the communicator in the present embodiment.

Note that when the image data is a video of certain length, the sensor information to be transmitted may be an identifiable portion from the time information included in the same detection result with priority rank data 321 and not the entirety of the image data shown in detection result with priority rank data 321.

In information processing apparatus 200 configured in such a way, the image data of scenes with large numerical differences or type differences in the object detection results from the detectors with different capability conditions is transmitted to server apparatus 103 with higher priority. In server apparatus 103, the retraining is performed for enhancing the real-time object detection accuracy using the image data provided by information processing apparatus 200. Not all of the image data, however, can necessarily be transmitted from information processing apparatus 200 to server apparatus 103 owing to the amount of the data, computational resources, transmission speed, and the like. Even in such cases, image data of scenes with a type difference in or a larger numerical difference between the result of the real-time object detection process and the result of the not real-time but more accurate object detection process is transmitted to server apparatus 103 with higher priority. The above retraining in server apparatus 103 using the image data thus transmitted can advance the AI more efficiently or effectively.

Operation

Figure 4:
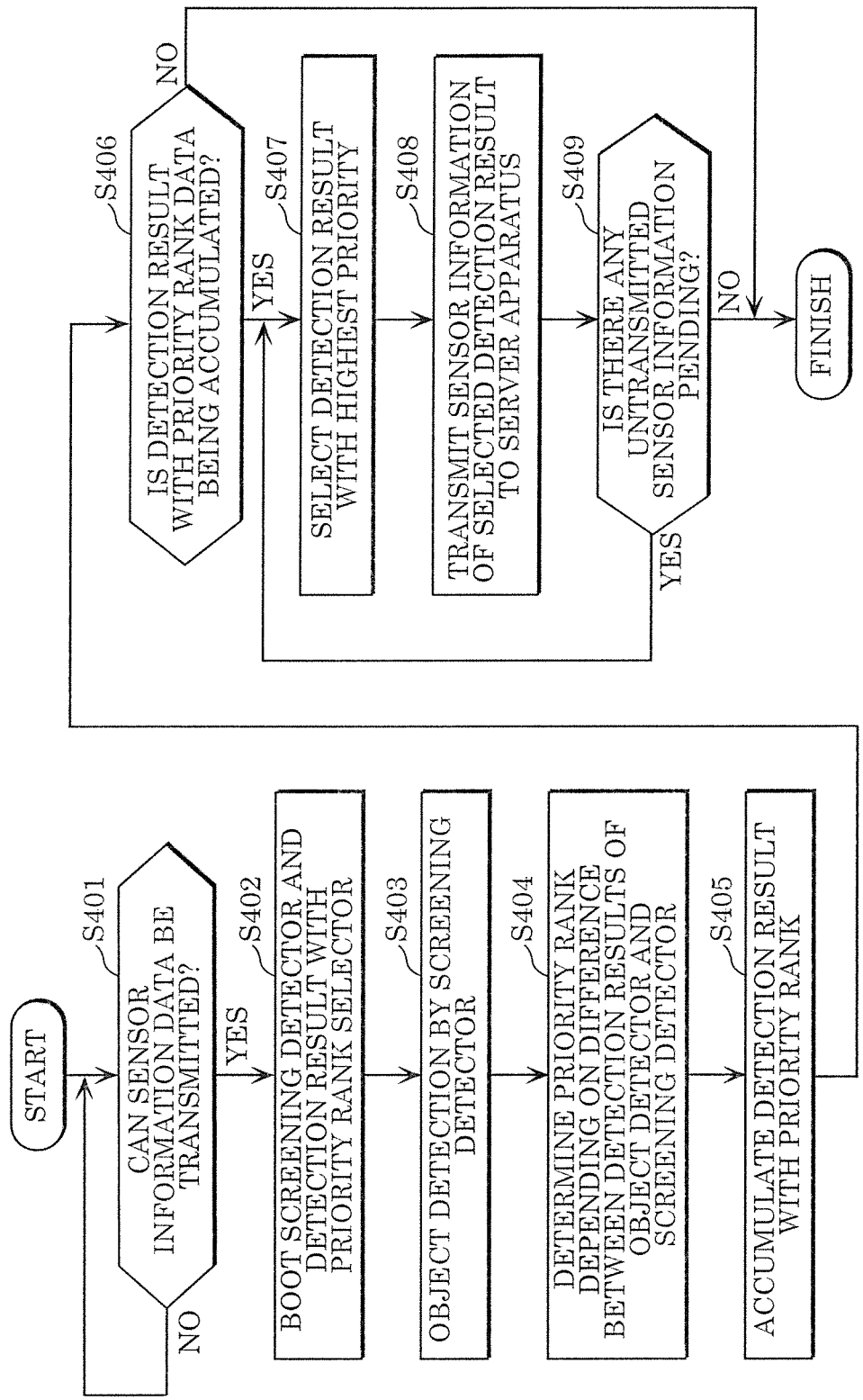
FIG. 4 is a flowchart of an operational procedure example of a process by the information processing apparatus in the embodiment.

An operation of information processing apparatus 200 configured as mentioned above will be described next. FIG. 4 is a flowchart of an operational procedure of information processing apparatus 200. Note that before this sequential procedure, the real-time object detection process, i.e., the first recognition process, is executed by object detector 203, and the detection result data including this first recognition result is accumulated by detection result accumulator 204. The sensor information output by sensor 202 and used in the object detection of object detector 203 is saved to the storage apparatus of self-driving car 101.

Detection result transmission possibility verifier 205 first determines whether the sensor information can be transmitted to server apparatus 103 based on the above predetermined information, e.g. whether self-driving car 101 is parked (step S401).

When the sensor information cannot be transmitted (NO in step S401), step S401 is executed again at a later time.

When the sensor information can be transmitted (YES in step S401), detection result transmission possibility verifier 205 causes the controller to boot up screening detector 201 and detection result with priority rank selector 207 (step S402).

Next, the booted up screening detector 201 executes the second recognition process that takes the sensor information as input (step S403). The sensor information that is input corresponds to one of scenes identified by respective IDs in the detection result data.

Screening detector 201 next obtains the difference between the first recognition result of the first recognition process and the second recognition result of the second recognition process both with respect to the sensor information of a scene identified by an ID, and determines the transmission priority rank of the sensor information of the scene in question depending on this difference (step S404). The determined priority rank is accumulated by detection result with priority rank accumulator 206 as a portion of the detection result with priority rank data along with the second recognition result (step S405).

Subsequently, when detection result with priority rank selector 207 confirms detection result with priority rank accumulator 206 is running (YES in step S406), detection result with priority rank selector 207 selects the detection result data with the highest priority rank from the detection result with priority rank data accumulated by detection result with priority rank accumulator 206 (step S407).

The sensor information based on this selection result, more specifically the image data shown in detection result with priority rank data or a portion thereof, is then transmitted from detection result transmitter 208 to server apparatus 103 via network 102 (step S408).

After that, untransmitted data is transmitted starting from the pending sensor information with the highest priority rank (YES in step S409 and step S407 and the following steps are repeated).

When detection result with priority rank accumulator 206 is not running (NO in step S406), or when all of the sensor information to be transmitted has been transmitted to server apparatus 103 (NO in step S409), the sequential procedure is finished.

Such an operation enables information processing apparatus 200 to provide sensor information for streamlining the retraining, which is performed in server apparatus 103 for improving the accuracy of the real-time object detection executed by object detector 203, to server apparatus 103 with priority.

Variations

Variations of the information processing apparatus according to the above embodiment will be described with reference to FIGS. 5 to 10.

Screening detector 201 in the embodiment has been described as executing the object detection based on the sensor information, having different capability conditions from object detector 203, and not being real-time but producing more accurate results, but is not limited thereto. Hereinafter, a variation related to screening detector 201 will be described.

Figure 5:
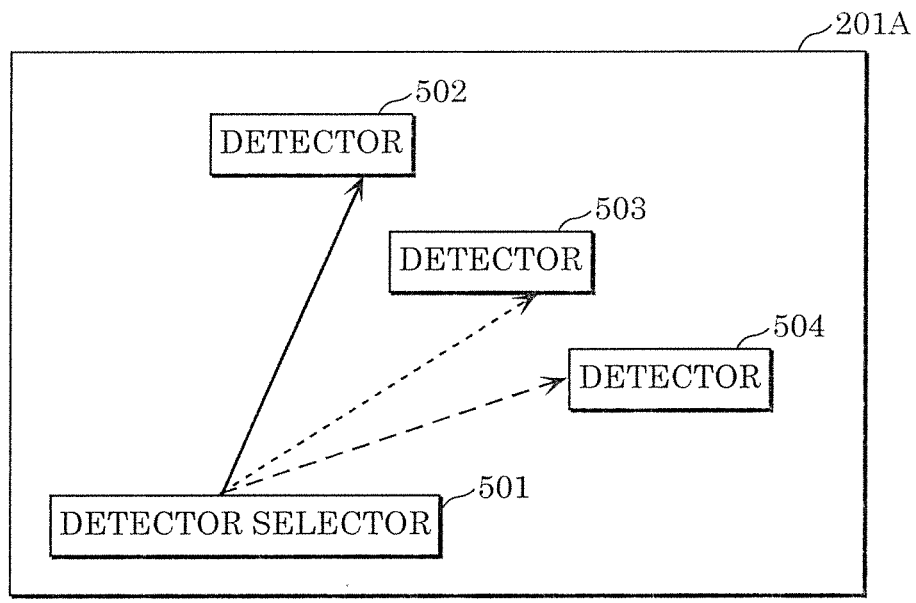
FIG. 5 is a block diagram showing an example of a configuration of a screening detector in a variation of the embodiment.
Figure 6:
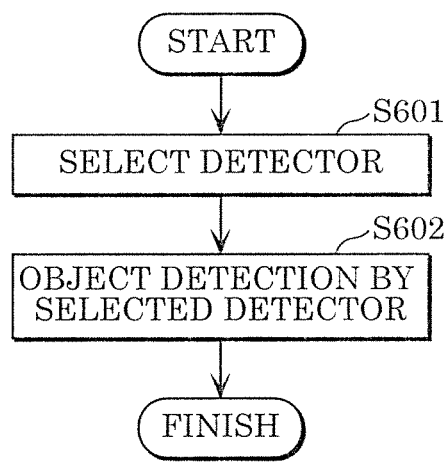
FIG. 6 is a flowchart of an operational procedure example of a process by the screening detector in the variation of the embodiment.

FIG. 5 is a block diagram for describing a functional configuration of screening detector 201A that is another example of the screening detector that may be included in the information processing apparatus according to the above embodiment. FIG. 6 is a flowchart of an operational procedure of screening detector 201A in this example.

Screening detector 201A includes detector selector 501, detector 502, detector 503, and detector 504.

Detectors 502, 503, and 504 each perform the object detection with different capability conditions. More specifically, for example, the image size or resolution of the object detection process is different. Detectors 502, 503, and 504 may also each perform object detection specialized for different types of objects. The computational resources used for the operation of the object detection may differ as well due to the different capability conditions.

Detector selector 501 selects a detector from detectors 502 to 504 to function as screening detector 201A which performs the object detection in step S403 (step S601). This selection is performed, for example, depending on a request from server apparatus 103 up to this point in time. The requests from server apparatus 103 are, for example, for object detection upon a specified type of objects, e.g. "pedestrian."

The object detection by screening detector 201A is executed (step S403) when the detector selected by detector selector 501 executes the object detection (step S602).

A plurality of detectors may be selected for executing the object detection, and the object detection by the plurality of selected detectors may be executed successively and in parallel.

Figure 7:
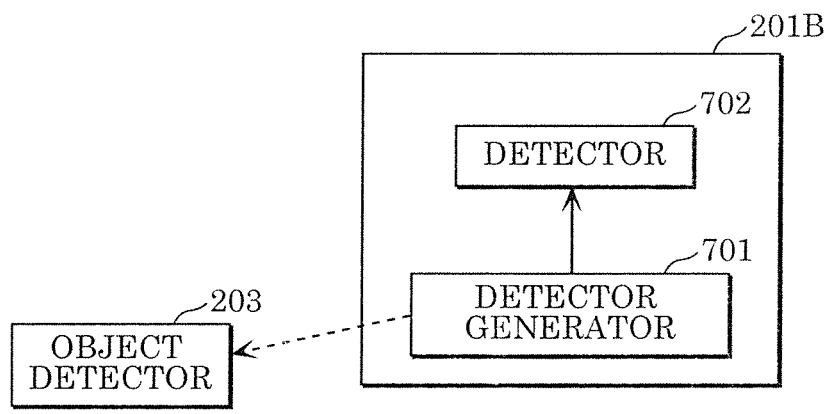
FIG. 7 is a block diagram showing an example of a configuration of a screening detector in the variation of the embodiment.
Figure 8:
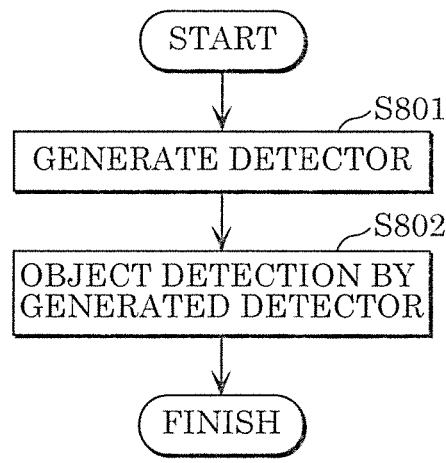
FIG. 8 is a flowchart of an operational procedure example of a process by the screening detector in the variation of the embodiment.

FIG. 7 is a block diagram for describing a functional configuration of screening detector 201B that is another example of the screening detector that may be included in the information processing apparatus according to the above embodiment. FIG. 8 is a flowchart of an operational procedure of screening detector 201B in this variation.

Screening detector 201B includes detector generator 701 and detector 702.

Detector generator 701 generates detector 702 based on object detector 203 (step S801). In the generation of detector 702 based on object detector 203, a detector is realized with better recognition performance or processing performance than object detector 203 by updating the capability conditions of object detector 203, e.g. using larger (high-resolution) input images than when object detector 203 is operating, increasing the bit depth of the parallel computing of the processer, or boosting the frequency of the processor. Computational resources that are not available during self-driving, such as hardware resources (e.g. computing power or memory used by a control system application during self-driving), electric power, or the like may additionally be used to realize a detector with enhanced recognition performance or processing performance.

The object detection by screening detector 201B is executed (step S403) when detector 702 generated by detector generator 701 executes the object detection (step S802).

Figure 9:
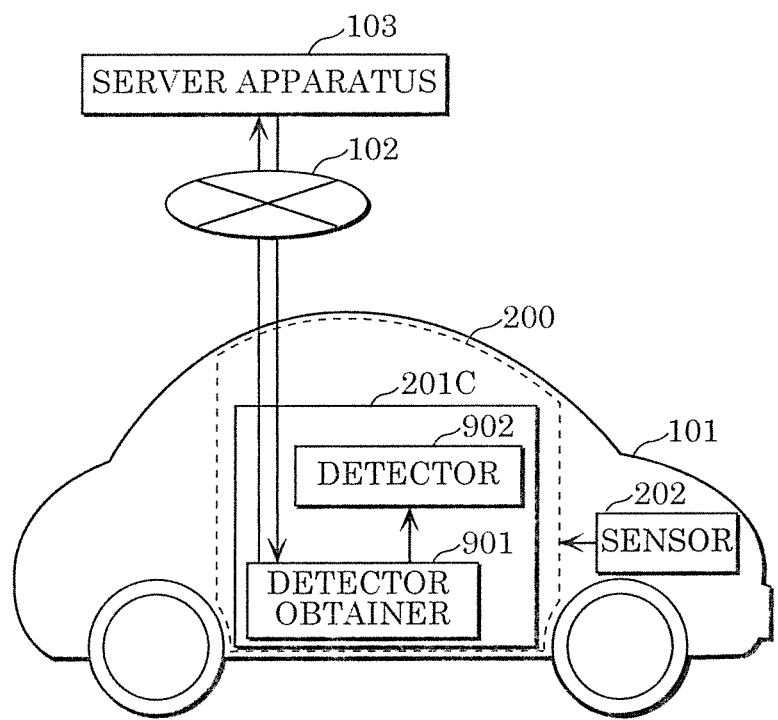
FIG. 9 is a block diagram showing an example of a configuration of a screening detector in the variation of the embodiment.
Figure 10:
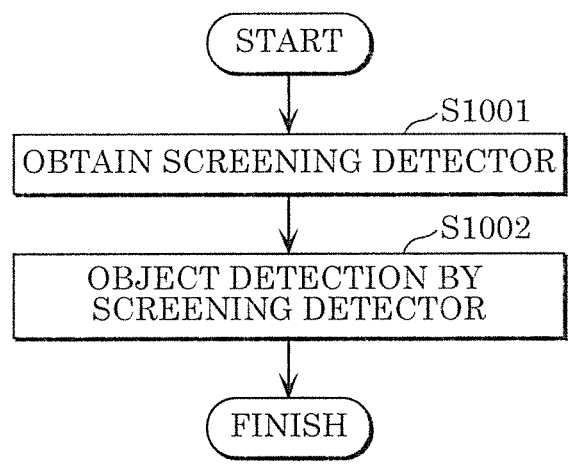
FIG. 10 is a flowchart of an operational procedure example of a process by the screening detector in the variation of the embodiment.

FIG. 9 is a block diagram for describing a functional configuration of screening detector 201C that is another example of the screening detector for executing the object detection in the information processing apparatus according to the above embodiment. FIG. 10 is a flowchart of an operational procedure of information processing apparatus 200 in this example.

Screening detector 201C includes detector obtainer 901.

Detector obtainer 901, for example, requests and obtains a recognition model (or component data, such as the neural network) to be used as detector 902 from server apparatus 103 via network 102 (step S1001). In information processing apparatus 200, the object detection by screening detector 201C is executed (step S403) by performing the object detection in which the processor uses this obtained recognition model (step S1002). In the case of a configuration in which the component data, e.g. the neural network, is obtained, detector 902 may also be materialized by object detector 203 loading the component data, e.g. the neural network, as parameters of the recognition model.

Note that the above aspects may be combined. For example, the screening detector may generate a plurality of detectors, and the plurality of detectors may be replaced regularly or irregularly by detectors provided from server apparatus 103. The object detection by the detectors provided from server apparatus 103 and the object detection by the detectors generated by detector generator 701 may be executed successively or in parallel.

Each of these aspects in the variations make it possible to flexibly change the capability conditions of a screening detector for use depending on the conditions of the car including information processing apparatus 200 and the intended purpose of the retraining, and to execute the second recognition process. As a result, the retraining in server apparatus 103 for improving the accuracy of object detector 203 can be executed more efficiently.

In the aspect in which detectors are provided from server apparatus 103, as with screening detector 201C, a detector, for example, that detects a new type of object may also be provided. This makes it possible to transmit the sensor information used in the training for future functionality expansion to server apparatus 103 more efficiently.

Other Embodiments

The information processing apparatus according to the present disclosure has been described above based on the embodiment and the variation thereof, but the present disclosure is not limited to the foregoing.

For example, the operational procedure of the information processing apparatus according to the present disclosure is not limited to the content in FIG. 4. Each of the steps shown in the blocks of flowchart in FIG. 4 may be replaced and a plurality of steps may be executed in parallel provided no inconsistencies are introduced. A portion of the steps may be omitted or extra steps may be added. For example, detection result transmission possibility verifier 205 may redetermine right after the YES in step S406 or right before step S409 whether the sensor information can be transmitted based on the charging conditions of the car or the available transmission bandwidth. When transmission is not possible, the sequential procedure may be finished or suspended temporarily and detection result transmission possibility verifier 205 may redetermine whether transmission is possible after a predetermined amount of time.

When the user starts using the self-driving car while the sequential process of the flowchart in FIG. 4 is being executed, the process halts or finishes and the self-driving car is immediately returned to a state in which self-driving is possible. However, when this process is beneficial to the user (e.g. a process for parking the car in the garage of the user), the user is prompted for permission whether to continue the image data transfer process via a dialogue message displayed on the dashboard and the like or an audio message.

Only a portion of the sensor information may be subject to be transmitted. For example, sensor information in which the first recognition result and the second recognition result are identical or the numerical difference is smaller than a predetermined size may be excluded from being transmitted. Only sensor information in which the first recognition result and the second recognition result have a predetermined type difference may be transmitted as well. In other words, the transmission necessity of the sensor information may be determined by replacing or adding conditions to the determining of the priority rank in step S404.

The same priority rank may be assigned to a plurality of detection result data sets. In this case, the transmission order of the sensor information may be determined based on other preset criteria, e.g. the time, predetermined order of the detected object types, reliability in descending or ascending order, other information included in the detection result data, or the size of the data to be transmitted. The transmission order of the sensor information to be transmitted may also be determined using such a means when only the transmission necessity of the sensor information is determined as described above.

Sensor information that fulfills the predetermined condition may be prioritized over the other sensor information and used in the object detection of screening detector or transmitted to server apparatus 103. An example of this predetermined condition includes a condition related to the time the sensor information is been generated. With this, for example, sensor information generated at a certain time during driving is processed with priority. A different example may be a condition related to the control details for allowing the car including information processing apparatus 200 to drive at the time the sensor information has been generated. For example, sensor information generated when the driver or the self-driving system performs a certain control, e.g. sudden braking, may also be processed with priority. Yet another example may be a condition related to the external conditions of the car. For example, sensor information generated while the car is driving in certain weather or places, e.g. rain, on poor roads, or in a tunnel, may also be processed with priority.

This enables collecting sensor information under conditions in which it is difficult to collect training data and conditions in which one specifically wants to enhance the recognition accuracy, and to facilitate the retraining for improving the real-time object detection precision.

More detailed information may be included in the detection result data for assigning the priority rank under such predetermined conditions and processing the sensor information. FIG. 11 is a diagram showing another example of detection result data. Detection result data 1301 shown in FIG. 11 includes information 1101 relating to concrete driving controls and information 1102 relating to external conditions (hereinafter referred to as external conditions information) under braking conditions 1306. Driving control information 1101 and external conditions information 1102 are, for example, measured by various sensors included in self-driving car 101, and information processing apparatus 200 receives this information from other ECU and the like connected to the on-board neural network and may be included in detection result data 1301 along with detection result 304. Note that in the example of FIG. 11, driving control information 1101 and external conditions information 1102 are subitems of braking conditions 1306, but the structure of the detection result data is not limited thereto. For example, information such as the foot brake being operated or not, pressing force, and operating time may be included as subitems of braking conditions 1306, and driving control information 1101 and external conditions information 1102 may be at the same item level as braking conditions 1306.

For example, screening detector 201 may refer to this information and execute the objection detection on priority basis with respect to the corresponding sensor information. Screening detector 201 may assign a high priority rank regardless of the presence or absence, or size of a difference in the detection result by object detector 203 for the priority transmission of the sensor information corresponding to such detection result data 1301, and detection result with priority rank selector 207 may refer to this information and cause the information to be transmitted by detection result transmitter 208 with priority.

A structure of the data used for transmitting the sensor information according to the determined transmission necessity or priority rank depending on the difference between the first recognition result and the second recognition result is not limited to the structure of detection result data 301 or detection result with priority rank data 321. For example, the priority rank may be managed in a different table along with the scene ID instead of detection result with priority rank data 321. The structure of this other information data is not limited as long as the information is managed while still correlating to detection result with priority rank data 321.

Each of the components described in the embodiments may be implemented as software, and may also typically be implemented as a large scale integrated (LSI) circuit. These components may be implemented on individual chips and may also be partially or entirely implemented on one chip. LSI here may also be referred to as integrated circuit (IC), system LSI, super LSI, or ultra LSI depending on the degree of integration. Implementing the components on an IC is not limited to LSI, but may also be achieved by using a dedicated circuit or a general-purpose processor. A field-programmable gate array (FPGA) that can be programmed or a reconfigurable processor in which the connections of the circuit cells inside the LSI circuit or the settings can be reconfigured may also be used after the LSI circuit has been manufactured. Furthermore, when new technologies replacing LSI are introduced clue to the advancement of semiconductor technology, those techniques may naturally also be used to integrate the components.

An aspect of the present disclosure may also be recorded on a computer-readable recording medium with a computer program or a digital signal of data including this computer program, e.g. a floppy disk, hard drive, CD-ROM, magneto-optical drive, DVD, DVD-ROM, DVD-RAM, Blu-ray (registered trademark) Disc (BD), or semiconductor memory. An aspect of the present disclosure may also be the digital signal stored on these recording media.

An aspect of the present disclosure may also be transmitted via a network typically being a telecommunications line, radio or cable communications line, or the internet; data-casting; and the like that transmits the computer program or digital signal.

An aspect of the present disclosure may be a computer system including a micro-processor and memory, the memory may contain the above computer program, and the micro-processor may operate following instructions of the computer program. The above information processing apparatus is an example of such a computer system.

The information processing apparatus may also be implemented by transferring the program or digital signal to a recording medium, transferring the program or digital signal via a network and the like, or as different independent computer system.

Forms realized by optionally combining components and functions in the embodiments and variations which are within the scope of the essence of the present disclosure are included in the present disclosure.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure can be used for efficiently adopting a recognition model used in a self-driving car including a real-time object detector in a mechanism for remotely enhancing the self-driving car.

What is claimed is:

1. An information processing apparatus installed in a vehicle that is communicatively connected to a server apparatus, the information processing apparatus being configured to:
   cause a first neural network to execute a first recognition process that takes sensor information as input, and a second neural network to execute a second recognition process that takes the sensor information as input, the second neural network being configured to operate under different capability conditions from the first neural network;
   determine one of a transmission necessity and a transmission priority of the sensor information depending on a difference between a first recognition result of the first recognition process and a second recognition result of the second recognition process; and
   transmit only portions of the sensor information deemed suitable as vehicle training data to the server apparatus according to the one of the transmission necessity and the transmission priority determined, wherein
   the sensor information is vehicle sensor information, and
   the sensor information is used by a controller of the vehicle, which is a self-driving car, to control the driving operations of the self-driving car.

2. The information processing apparatus according to claim 1, being further configured to:
   cause the second neural network to use more computational resources than the first neural network.

3. The information processing apparatus according to claim 1, being further configured to:
   determine one of the transmission necessity and the transmission priority depending on a numerical difference between the first recognition result and the second recognition result.

4. The information processing apparatus according to claim 1, being further configured to:
   determine one of the transmission necessity and the transmission priority depending on a type difference between the first recognition result and the second recognition result.

5. The information processing apparatus according to claim 1, being further configured to:
   determine whether the vehicle including the information processing apparatus has a surplus of computational resources greater than or equal to a predetermined amount, and
   cause the second neural network to execute the second recognition process when it is determined that the vehicle has a surplus of the computational resources greater than or equal to the predetermined amount.

6. The information processing apparatus according to claim 1, being further configured to:
   cause the second neural network to perform the second recognition process according to one of (i) available computational resources in the vehicle including the information processing apparatus and (ii) a training purpose for the first neural network.

7. The information processing apparatus according to claim 1, being further configured to:
   cause the second neural network to be obtained from the server apparatus via communication.

8. The information processing apparatus according to claim 1, being further configured to:

prioritize sensor information that fulfills a predetermined condition over other sensor information, and cause the second neural network to execute the second recognition process on the sensor information prioritized.

9. The information processing apparatus according to claim 8, being further configured to:
determine whether sensor information fulfilling a condition related to one of (i) time information indicating a time at which the sensor information is generated, (ii) driving control information indicating control details for allowing the vehicle including the information processing apparatus to drive, and (iii) external environment information indicating an outside environment of the vehicle is the sensor information that fulfills the predetermined condition.

10. A non-transitory computer-readable recording medium for use in a computer, the recording medium having a computer program that is executed by a processor included in an information processing apparatus installed in a vehicle that is communicably connected to a server apparatus, the program being configured to cause the processor to:
execute a first recognition process that takes sensor information as input by a first neural network;
execute a second recognition process that takes the sensor information as input by a second neural network that has different capability conditions from the first neural network;
determine one of a transmission necessity and a transmission priority of the sensor information depending on a difference between a first recognition result of the first recognition process and a second recognition result of the second recognition process; and
transmit only portions of the sensor information deemed suitable as vehicle training data to the server apparatus according to the one of the transmission necessity and the transmission priority determined, wherein
the sensor information is vehicle sensor information, and
the sensor information is used by a controller of the vehicle, which is a self-driving car, to control the driving operations of the self-driving car.

11. The information processing apparatus according to claim 1, wherein
the sensor information that is transmitted is vehicle training data for training the first neural network.

* * * * *